United States Patent Office 3,444,591
Patented May 20, 1969

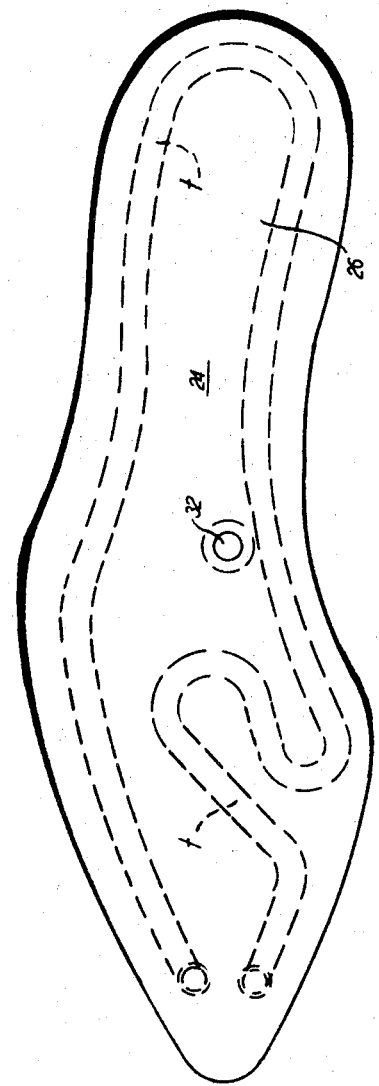
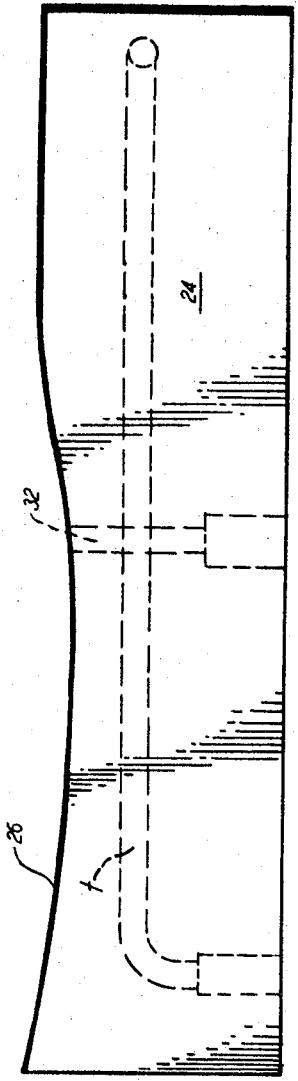

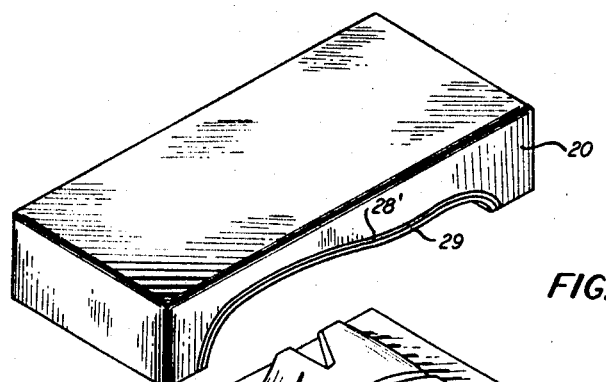
FIG.-9
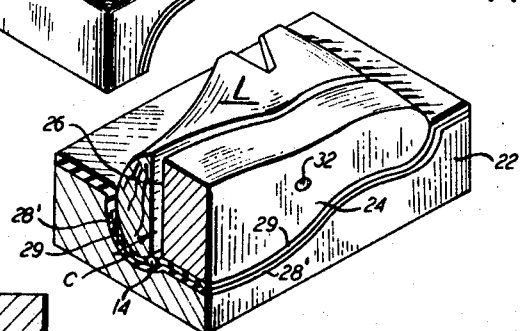
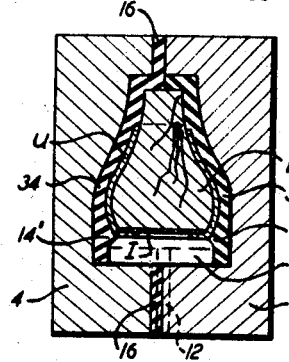
FIG.-11
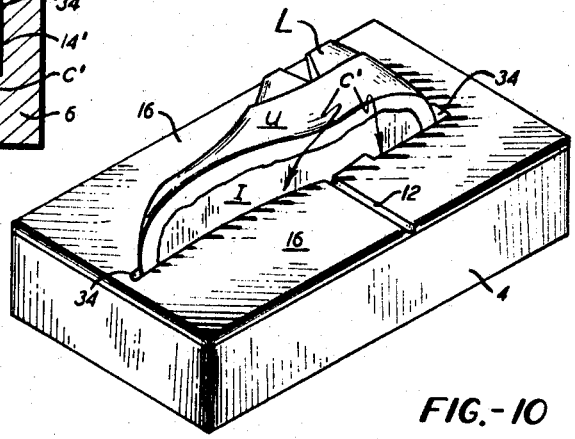
FIG.-10

3,444,591
APPARATUS FOR CASTING AN ARTICLE ONTO A WORKPIECE
Michael M. Becka, Cambridge, and Gordon S. Anderson, Framingham, Mass., assignors to Jacob S. Kamborian, Boston, Mass.
Filed Oct. 8, 1965, Ser. No. 494,133
Int. Cl. B29c 1/00
U.S. Cl. 18—42                    6 Claims

ABSTRACT OF THE DISCLOSURE

An apparatus for casting an article onto a workpiece that comprises a mold having a cavity that supports the workpiece. The workpiece does not occupy the entire cavity and fluent molding material may be caused to fill that portion of the cavity unoccupied by the workpiece.

---

This invention relates to an apparatus for injection molding a shoe sole or other article of a fluent molding material onto a shoe-shaped member or other workpiece. Incorporated in the apparatus is a cavity, one surface of which is formed by the bottom of the shoe-shaped member itself (or other desired surface of any other workpiece) so that when the fluent molding material is introduced to the cavity it will cause the molded shoe sole (or other article) to conform in part to the bottom of the shoe-shaped member. The mold may be of a type which may be readily cast from epoxy compounds, thus eliminating the relatively high cost of fabricating a mold having finely machined surfaces.

Among the objects of the invention are:

To provide a mold which is relatively simple and inexpensive to manufacture;

To provide a mold having a seal which is operative to effectively seal the cavity thereof under varied conditions;

To provide an apparatus capable of injection molding a shoe bottom unit onto the bottom of a lasted shoe while the shoe is still on its making last; and To provide an apparatus for fabricating a shoe insole which eliminates the time and labor consuming steps which were heretofore prevalent in the shoe making industry of cutting, skiving, and cementing various segments of an insole to thus form a unitary and complete insole.

Other objects and advantages of the invention will become apparent from the following detailed description wherein:

FIGURE 7 is a plan view of the sole plate;

FIGURE 8 is a side elevation of the sole plate;

FIGURE 9 is a view of the three-piece mold illustrated in FIGURE 3 additionally illustrating the use of a double liner therewith;

FIGURE 10 is a view of the two-piece mold with the upper mold section removed and having a mold cavity corresponding in shape to that of a finished shoe, there being a last having a lasted upper mounted thereon contained within the lower mold section; and FIGURE 11 is a sectional view of the two piece mold having a mold cavity of a shape corresponding to that of a finished shoe and having a last within an insole located at its bottom and an upper lasted thereto encapsulated between the mold sections.

Figure 1:
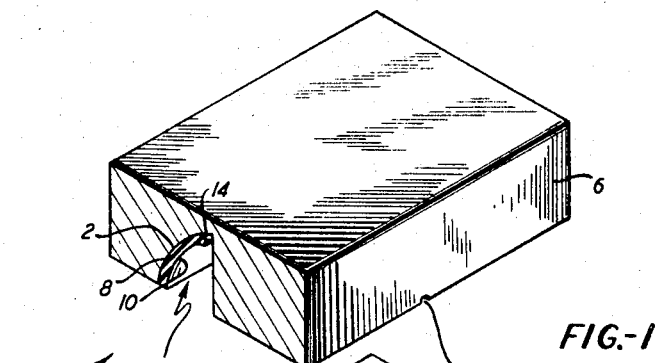
FIGURE 1 is a partly sectional view of the upper and lower sections of the two piece mold in a separated condition having a bare last located in the lower section and illustrating the relationship between the last, the single liner and the mold cavity.

Referring to FIGURE 1, included in the apparatus is a mold *m* having a major cavity 2 formed therein. The mold *m* is separable into a lower section 4 and an upper section 6 with a portion of the major cavity 2 being formed in each of the adjacent faces of the mold sections so that when the adjacent faces of the mold sections are brought together the complete major cavity 2 is defined. The interior wall of the major cavity is provided with a liner 8 which is bonded or otherwise secured thereto, the inner surface 10 of the liner 8 defining another cavity, hereinafter referred to as the mold cavity 11. The mold cavity 11 has a portion thereof corresponding in shape to that of the workpiece so that the workpiece may be supported within the mold cavity 11 during the molding process in such a manner that a portion of the mold cavity which will hereinafter be referred to as the minor cavity *c*, may remain unoccupied. The minor cavity *c* is thus bounded by a surface of the workpiece, the liner 8, and a surface of the major cavity not covered by the liner. In the illustrative embodiment of the invention the workpiece is a shoe-shaped member (a last or a last having a shoe upper U lasted thereon) and the configuration of the minor cavity *c* corresponds to that of a shoe insole or a shoe outsole, however, it is to be understood that the instant invention, in its broader aspects, may be used with a mold cavity 11 and minor cavity *c* of any desired shape and is not limited to use solely in the shoe art. A sprue 12 is located in the mold *m* in such a manner as to communicate the fluent molding material from a source thereof (not shown) to the minor cavity *c*.

Figure 4:
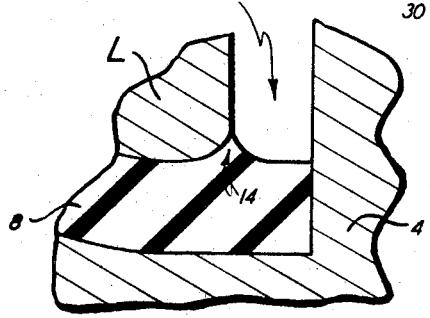
FIGURE 4 is a greatly enlarged sectional view of the region of disunion in the two-piece mold illustrated in FIGURE 1.

It is of great importance that a perfect seal be obtained between the liner 8 and the workpiece particularly in the region where the workpiece and the liner meet to define the minor cavity *c*. This region, which is designated by the numeral 14 will hereinafter be referred to as the region of disunion and is illustrated in enlarged cross-sectional detail in FIGURE 4.

In the illustrative embodiment of the invention, the region of disunion 14 extends about and circumscribes the shoe shaped member at that portion thereof where the shoe shaped member and the shoe sole cease to have a common abutting surface, and therefore become disunited. Should the seal at the region of disunion 14 be imperfect, the fluent molding material which is introduced into the minor cavity *c* under pressure, may leak past this region, thereby permitting the molding material to flow between the workpiece and the liner 8 and thereby cause undesirable flash to form. To insure such a perfect seal, the liner 8 must be formed from a material possessing qualities of resilience and compressibility which are greater than that of the material out of which the mold sections 4 and 6 are fashioned and are such that the liner 8 may be pressed tightly about the workpiece, particularly in the region of disunion 14, and yet be able to conform to any irregularities or deformities on the surface of the workpiece. The pressure under which the fluent molding material is introduced into the minor cavity c is an important consideration in determining the particular lining material in that as the pressure is increased, the liner material must be less resilient and compressible in order to withstand deformation due to these higher pressures, however, although less resilient and compressible, the liner material must still be capable of conforming to irregularities on the surface of the workpiece. In this respect, the maximum pressures with which the instant invention may be used is limited only by the state of the chemical arts and the availability of such suitable liner materials.

In utilizing the apparatus to fabricate an isole the mold cavity 11 is constructed so as to have a shape corresponding to that of a last L with an insole located at its bottom. The last L lacking an insole is placed in the lower section 4 of the mold m where that portion of the liner 8 which is in the lower section 4 is receptive to the last, i.e., the mold cavity 11. The upper section 6 of the mold m is then placed upon the lower section 4 to thereby encapsulate the last L within the mold cavity 11 and to thus form the insole-shaped minor cavity c, one wall of which consists of the bottom of the last L itself. Conventional locating pins (not shown) may be used to insure proper mating of the upper and lower sections of the mold. When the last is properly positioned in the mold, the upper and lower sections thereof are pressed together under increased force to cause the liner 8 to be pressed against the last L thereby urging the resilient, compressible liner 8 into conformity with any irregularities on the surface of the last so that the resistance presented to the flow of the fluent molding material beyond the region of disunion 14 may be increased. Liner materials that have been satisfactorily utilized in the apparatus illustrated in FIGURE 1 are the silicon rubber compositions known as "Ecosil 4850," "Ecosil 4855" and a polyurethane composition, "CPC 23," all of which are commercially available from the Emerson and Cuming Company of Canton, Mass.

In order to permit the mold sections to be pressed together, a sheet 16 of material, preferable having the same qualities of resilience and compressibility as that of the liner material, is interposed between the adjacent faces of the upper and lower sections 6, 4 of the mold. The sheet 16 also serves to provide a leakproof seal at the adjacent faces of the upper and lower mold sections 6, 4. When the mold sections are so pressed together the apparatus is ready to receive a suitable fluent molding material in the minor cavity c. For a purpose which will be later described, it may be desirable to utilize a molding material which may become secured to the bottom of the last when cured to solidification.

Figure 2:
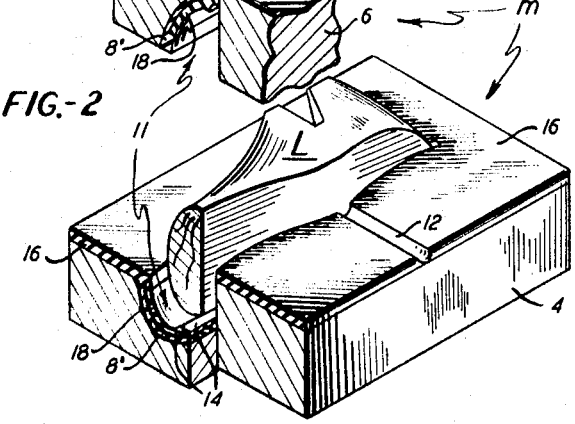
FIGURE 2 is a view similar to that of FIGURE 1 illustrating a double liner.

A variation of the above described apparatus is also suitable for use with increased molding pressures. Referring to FIGURE 2 an apparatus is provided which is substantially identical to that illustrated in FIGURE 1 except that a composite liner is used. An additional liner 18, formed from a material which is less resilient and compressible in character than the material from which the liners 8', 8 are formed, is inlaid into the liner 8', so that the inner surface of the liner 8' is contiguous with the inner surface of the additional liner 18 to thereby form and define the mold cavity 11. The additional liner 18 is so constructed as to be located at least about the region of disunion 14. Thus when the upper and lower sections 6, 4 of the mold m are pressed together, the seal formed at the region of disunion 14 may be more resistant to leakage than if the single liner 8 formed from the more resilient and compressible material were used alone.

Compositions which have found to be satisfactory are "Ecosil 4850" for the liner 8' and "Stycast 1263" or "Stycast 1264" for the additional liner 18, all of which are available from the aforementioned Emerson and Cuming Company.

Figure 3:
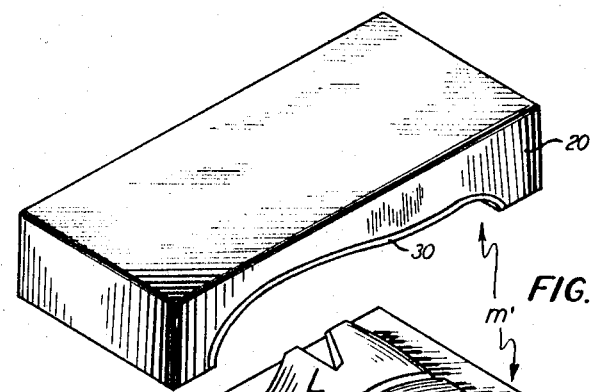
FIGURE 3 is a view of a three piece mold in a separated condition, the lower section and sole plate being partly cut away to more clearly illustrate the relationship between the mold section, the last, the liner and the sole plate.

Due to the two-part mold construction, the apparatus as shown in FIGURES 1 and 2 will produce a shoe sole having a flash line located at its bottom and running lengthwise of the shoe along the line where the mold sections are sealed by the resilient sheet 16. This flash line may be avoided by using a mold having a three-piece construction as opposed to the two-piece construction previously described. Referring to FIGURE 3, the mold m' has an upper section 20, a lower section 22 and a third section, hereinafter referred to as the sole plate 24. The sole plate is more clearly shown in FIGURES 7 and 8 from where it may be seen that it has a surface 26 having a contour corresponding to the contour of the bottom of a shoe sole or other article to be cast. The mold sections 20, 22 are so constructed as to accept the sole plate 24 in such a position that the surface 26 of the sole plate 24 will face the bottom of the shoe-shaped member and will thus define a wall of the minor cavity c. Means (not shown) are provided for rigidly supporting the sole plate with respect to the upper and lower mold sections 20, 22. The remainder of the mold m' is constructed in substantially the same manner as earlier disclosed and illustrated in FIGURE 1, there being a single liner 28 provided which is formed from a resilient, compressible material. The liner 28 may be provided with extensions 30 as shown in FIGURE 3, to be interposed between the edge of the sole plate 24 and each of the mold sections so that the last L and sole plate 24 may also be pressed between the mold sections 20, 22 when the mold sections are compressed to insure a seal about the region of disunion 14. Thus when the last L is contained within the mold m', the minor cavity c will be defined by the bottom of the last L, the surface 26 of the sole plate 24, and that portion of the liner 28 which spans the gap between the surface 26 of the sole plate 24 and the bottom of the last L. A sprue 32 is formed in the sole plate to allow the fluid molding material to be introduced into the minor cavity c.

The variation shown in FIGURE 2 of providing an additional liner 18 to create a more effective sealing of the minor cavity c may be incorporated into the three-piece mold. Referring to FIGURE 9 it may be seen that the mold construction is substantially identical to that illustrated in FIGURE 3 except that an additional liner 29 is inlaid into the liner 28', the additional liner 29 being formed from a material which is less resilient and compressible than that from which the liners 28, 28' are formed. The additional liner 29 is so constructed as to be located at least about the region of disunion 14.

This type of construction combines the advantages of eliminating the flash line along the bottom of the molded sole caused by the use of a two-piece mold and insures an effective sealing of the minor cavity by the use of the additional, more rigid liner, when the fluent molding material is introduced at higher pressures.

It is generally desirable, particularly in women's high-heeled shoes, to provide an insole which is rigid from the heel end to the ball break, and relatively flexible from the ball break portion to the toe end. This result may be obtained when the complete insole is to be fabricated in the instant apparatus by constructing the mold so that the minor cavity c defines an insole which is thicker at those portions where rigidity is desired and thinner where greater flexibility is required.

Figure 5:
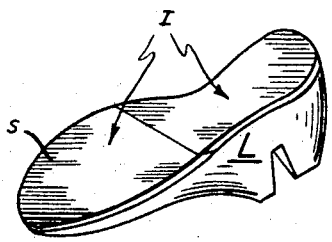
FIGURE 5 is a view of a last having an insole, which was formed according to the instant invention, located at its bottom.
Figure 6:
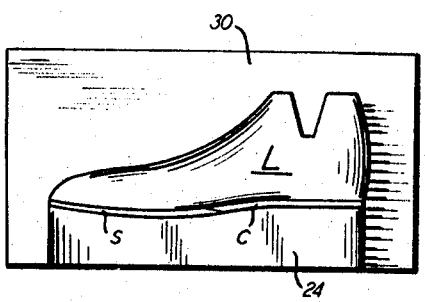
FIGURE 6 is a plan view of the three-piece mold with the upper mold section thereof removed and having a last and a preformed insole segment located within the mold.

The desired varying of insole flexibility may also be obtained by fabricating the insole from a number of components, at least one of which is molded in the aforementioned apparatus. Referring to FIGURE 6, a prefabricated segment s of an insole is located in the minor cavity c prior to introduction of the fluent molding material thereto. The mold secitons are then assembled to encapsulate both the last L and the insole segment s therein whereupon suitable fluent molding material may be introduced into the minor cavity c to fill that portion of the minor cavity c which is unoccupied by the insole segment s. The choice of materials of the insole segment s and the fluent molding material must be such that when the fluent molding material is introduced into the minor cavity c, thus flowing into contact with the insole segment, the two may become bonded to each other to form a contiguous and unitary insole I. The edge of the insole segment s which is to become bonded to the molded insole portion may be beveled to provide a greater bonding area. Thus it may be seen that by fabricating the insole segments and molded portions of the insole from materials possessing the desired characteristics of flexibility, a complete and unitary insole of varying flexibility may be produced. By the way of illustrative example, a fluent molding material known as "Tenite Polyallomer" which is commercially available from Eastman Chemical Products, Inc., Kingsport, Tenn., may be used in conjunction with an insole segment formed from the fibrous material known as "Texon' which is in common use in the fabrication of insoles under existing methods. "Texon" being more resilient than "Tenite Polyallomer," will cause the above fabricated insole to be more flexible at the toe portion than the heel portion thereof. FIGURE 5 is illustrative of a last having an insole I thus formed and located at its bottom.

Referring to FIGURE 10 it may be seen that the apparatus may be used to fabricate a molded shoe bottom unit which comprises an outsole and a heel or an outsole alone, the only modification being that of shaping the contour of the liner to define a mold cavity of a shape corresponding to that of a finished shoe so that when a shoe assembly which includes a last L having a shoe upper u lasted thereon but lacking a shoe bottom unit is contained within the mold cavity 11, the minor cavity c' will be of a shape corresponding to that of a shoe bottom unit and will be defined in part by the bottom of the shoe assembly. When using the instant invention to fabricate a shoe outsole or shoe bottom unit, the critical region of disunion 14' is located at the featherline portion of the shoe, i.e., where the shoe upper u and the liner 34 meet to define the minor cavity c' as opposed to the location of the region of disunion 14' when the workpiece is a bare last and an insole is to be fabricated, the region of disunion 14' then being situated where the bare last L and the liner meet to define the minor cavity.

The apparatus as illustrated in FIGURES 10 and 11 may be utilized to fabricate a shoe bottom unit of several components in much the same manner that the aforementioned multicomponent insole is formed by inserting a prefabricated component of a shoe bottom unit into the minor cavity c' prior to the introduction of the fluent molding material thereto so that upon such introduction the molded portion of the shoe bottom unit may become secured to the prefabricated portion thereof, thus producing a contiguous and unitary shoe bottom unit.

The herein disclosed apparatus may also be used in the fabrication of a completed shoe by forming an insole I as above described either completely from a suitable molding material or from an insole segment s of different composition in conjunction with a molding material, the molding material in either case being of such composition as to become secured to the bottom of the last upon curing to solidification as by permitting the disclosed thermoplastic fluent material to cool to its solid state. The last, with complete and unitary insole I securedly located at its bottom as illustrated in FIGURE 5 is then removed from the apparatus and a shoe upper u is then lasted to the insole I by having its margin wiped against the insole bottom in any desired way as, for example, by the arrangement shown in Patent No. 3,130,430. A shoe bottom unit may then be secured to the bottom of the lasted shoe either by conventional means or by utilization of the instant apparatus. By fabricating a shoe in the aforementioned manner there is no need for a skilled workman to manipulate a prefabricated insole with respect to the bottom of the last and subsequently secure the insole thereto in preparation for the lasting operation.

Due to the fact that the mold cavity of the above described apparatus may be fabricated so as to correspond in shape to any type of workpiece, it may be fabricated so as to be receptive to the same last upon which the insole was formed and the upper lasted, an advantage of which is that the common practice of transferring the lasted shoe from the last on which the lasting operation was performed to a second last which is suited for the singular purpose fabricating a molded outsole or shoe bottom unit, may be eliminated, thus permitting fabrication of a complete shoe on a single last.

When utilizing thermoplastic molding materials it is desirable to control the rate at which the material cools curing to solidification. For this purpose, the aforementioned molds may be provided with a conduit t which is embedded therein and is adapted to permit a fluid coolant to circulate therethrough. An example of such a conduit is illustrated in FIGURES 7 and 8.

We claim:
1. An apparatus for casting an article onto a workpiece comprising: a first mold section and a second mold section, the two mold sections having faces adapted to be forced toward each other; a cavity segment in each mold section located interiorly of its associated face, the cavity segments defining a cavity adapted to receive and support the workpiece when the mold sections are forced toward each other with a portion of the cavity being unoccupied by the workpiece, the junctions of the occupied and unoccupied portions of the cavity defining a line of disunion; a liner, formed from a material which is more resilient and compressible than the material from which said mold sections are formed, secured to the surface of each of said cavity segments and located along said line of disunion; a sheet of resilient, compressible material interposed between said faces and situated at the intersection of the line of disunion with said faces; and means enabling fluent molding material to be introduced into said unoccupied portion of the mold cavity.

2. An apparatus as defined in claim 1 wherein the sheet is so constructed as to encompass the cavity.

3. An apparatus as defined in claim 1 wherein each liner is so constructed as to bear against the entire surface of its associated cavity segment.

4. An apparatus as defined in claim 1 wherein each of said liners comprises: a first liner element adapted to bear against the workpiece; and a second liner element interposed between the first liner element and the surface of its associated cavity segment; said second liner elements being from a material which is more resilient and compressible in character than the material from which the first liner elements are formed.

5. An apparatus for casting an article onto a workpiece comprising: a first mold section and a second mold section, the two mold sections having faces adapted to be forced toward each other; a cavity segment in each mold section located interiorly of its associated face; a plate adapted to fit between the cavity segments, the cavity segments and the plate defining a cavity adapted to receive and support the workpiece when the mold sections are forced toward each other with a portion of the cavity being unoccupied by the workpiece, the junctions of the occupied and unoccupied portions of the cavity defining a line of disunion; a liner, formed from a material which is more resilient and compressible than the material from which said mold sections are formed, secured to the surfaces of said cavity segments and located along said line of disunion, said liners having portions extending between the contiguous surfaces of the mold sections and the plate so as to be sandwiched therebetween; and means enabling fluent molding material to be introduced into said unoccupied portion of the mold cavity.

6. The apparatus as defined in claim 4 further comprising: a sheet of resilient, compressible material interposed between said faces and situated at the intersection of the line of disunion with said faces.

References Cited

UNITED STATES PATENTS

| | | | |
|---|---|---|---|
| 3,113,830 | 12/1963 | Boccoli | 18—34 X |
| 3,314,640 | 4/1967 | Snow | 18—42 X |
| 3,345,664 | 10/1967 | Ludwig | 264—244 X |
| 3,380,123 | 4/1968 | Schmidt | 18—42 |

WILBUR L. McBAY, *Primary Examiner.*

U.S. Cl. X.R.

18—34; 264—244

PO-1050
(5/69)

UNITED STATES PATENT OFFICE
CERTIFICATE OF CORRECTION

Patent No. 3,444,591　　　　　　　　Dated　May 20, 1969.

Inventor(s) Michael M. Becka et al

It is certified that error appears in the above-identified patent and that said Letters Patent are hereby corrected as shown below:

```
Column 3: line 23, change "isole" to --insole--.
Column 7: line 8, change "4" to --5--.
```

SIGNED AND
SEALED
DEC 23 1969

(SEAL)
Attest:

Edward M. Fletcher, Jr.
Attesting Officer

WILLIAM E. SCHUYLER, JR.
Commissioner of Patents